(12) United States Patent  
Okuyama et al.

(10) Patent No.: US 9,325,022 B2  
(45) Date of Patent: Apr. 26, 2016

(54) GAS DIFFUSION LAYER FOR FUEL CELL AND METHOD FOR MANUFACTURING THE SAME

(75) Inventors: Yozo Okuyama, Yokosuka (JP); Shigemasa Kuwata, Yokohama (JP); Kazufumi Kodama, Zushi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 66 days.

(21) Appl. No.: 14/126,634

(22) PCT Filed: May 31, 2012

(86) PCT No.: PCT/JP2012/064156  
§ 371 (c)(1),  
(2), (4) Date: Dec. 16, 2013

(87) PCT Pub. No.: WO2012/172993  
PCT Pub. Date: Dec. 20, 2012

(65) Prior Publication Data  
US 2014/0120451 A1 May 1, 2014

(30) Foreign Application Priority Data  
Jun. 17, 2011 (JP) ................................. 2011-135067

(51) Int. Cl.  
*H01M 8/14* (2006.01)  
*H01M 8/10* (2006.01)  
*H01M 8/02* (2006.01)

(52) U.S. Cl.  
CPC .......... *H01M 8/1002* (2013.01); *H01M 8/0234* (2013.01); *H01M 8/0243* (2013.01); *H01M 8/0245* (2013.01); *Y02E 60/521* (2013.01); *Y02P 70/56* (2015.11)

(58) Field of Classification Search  
CPC ............ H01M 8/0234; H01M 8/0243; H01M 8/0245; H01M 8/1002; Y02E 60/521  
See application file for complete search history.

(56) References Cited

U.S. PATENT DOCUMENTS

| 2006/0134506 A1* | 6/2006 | Kim et al. ........................ 429/44 |
| 2009/0098440 A1* | 4/2009 | Hodgkinson et al. ........... 429/40 |

(Continued)

FOREIGN PATENT DOCUMENTS

| CN | 101662031 A | 3/2010 |
| EP | 1 333 513 A1 | 8/2003 |

(Continued)

OTHER PUBLICATIONS

European Extended Search Report, Dec. 8, 2014, 5 pages.

*Primary Examiner* — Patrick Ryan  
*Assistant Examiner* — Ben Lewis  
(74) *Attorney, Agent, or Firm* — Foley & Lardner LLP (57) ABSTRACT

A gas diffusion layer for a fuel cell includes a gas diffusion layer substrate and a microporous layer formed on the surface of the gas diffusion layer substrate. The microporous layer is formed into a sheet-like shape including a binder and a carbon material containing at least scale-like graphite, and the sheet-like microporous layer is attached to the gas diffusion layer substrate. The gas diffusion layer for a fuel cell having such a configuration, prevents the components included in the microporous layer from entering the gas diffusion layer substrate, so as to ensure gas permeability. In addition, the scale-like graphite contained in the microporous layer as an electrically conductive material improves electrical conductivity and gas permeability. Accordingly, the gas diffusion layer contributes to an improvement in performance of a polymer electrolyte fuel cell.

11 Claims, 11 Drawing Sheets (56) References Cited

U.S. PATENT DOCUMENTS

2010/0028750 A1 2/2010 Ji et al.
2010/0279209 A1* 11/2010 Jeong et al. .................. 429/518
2012/0034548 A1 2/2012 Okuyama et al.

FOREIGN PATENT DOCUMENTS

| EP | 2 426 762 A1 | 3/2012 |
|---|---|---|
| JP | 60-193269 A | 10/1985 |
| JP | 61-82672 A | 4/1986 |
| JP | 2006-012694 A | 1/2006 |
| JP | 2006-066139 A | 3/2006 |
| JP | 2008-059917 A | 3/2008 |
| JP | 2008-234968 A | 10/2008 |
| JP | 2009-076347 A | 4/2009 |
| JP | 2009-238748 A | 10/2009 |
| JP | 2010-070433 A | 4/2010 |
| JP | 2011-146373 A | 7/2011 |
| JP | 2011-198520 A | 10/2011 |
| JP | 2012-028047 A | 2/2012 |
| WO | WO 2007/088396 A1 | 8/2007 |
| WO | WO 2010/126063 A1 | 11/2010 |

* cited by examiner

GAS DIFFUSION LAYER FOR FUEL CELL AND METHOD FOR MANUFACTURING THE SAME

TECHNICAL FIELD

The present invention relates to a gas diffusion layer (GDL) which includes a microporous layer (MPL), used for a fuel cell, namely a polymer electrolyte fuel cell (PEFC). The invention also relates to a method for manufacturing the gas diffusion layer.

BACKGROUND ART

Polymer electrolyte fuel cells using solid polymer membranes having proton conductivity operate at a lower temperature compared with other fuel cells, such as solid oxide fuel cells and molten carbonate fuel cells. Therefore, the polymer electrolyte fuel cells are receiving increased attention as a driving power source for use in moving bodies such as vehicles and have already been put to practical use.

A gas diffusion electrode used in such a polymer electrolyte fuel cell generally includes an electrode catalyst layer and a gas diffusion layer. The electrode catalyst layer contains catalyst-supporting carbon fine particles covered with ion exchange resin (a polymer electrolyte) identical to, or different from, a polymer electrolyte membrane. The gas diffusion layer functions to supply reactant gas to the catalyst layer and collect charges generated in the catalyst layer. Gas diffusion electrodes are assembled in a manner such that the catalyst layers face the polymer electrolyte membrane, thereby forming a membrane electrode assembly (MEA). Plural membrane electrode assemblies are stacked on top of each other via separators having gas passages, so as to compose a polymer electrolyte fuel cell.

There is known a gas diffusion layer used in such a polymer electrolyte fuel cell wherein a microporous layer, mainly containing an electrically conductive substance such as a carbon material, is provided as an intermediate layer in the gas diffusion layer on the catalyst layer side. The intermediate layer is provided to decrease electrical resistance between the gas diffusion layer and the catalyst layer and also improve gas flow therein. The gas diffusion layer is composed of the microporous layer together with a gas diffusion layer substrate. Therefore, in the gas diffusion layer, the microporous layer itself is also required to have high gas permeability in addition to high electrical conductivity.

For example, Patent Literature 1 discloses layers used in such a gas diffusion electrode, wherein the layers have a structure consisting of fine knot portions and fine fiber portions including PTFE resin and contain electrically conductive substance powder (carbon black). The layers hold therebetween a layer also consisting of fine knot portions and fine fiber portions including PTFE resin but not containing electrically conductive substance powder.

CITATION LIST

Patent Literature

Patent Literature 1: Japanese Unexamined Patent Application Publication No. S60-193269

SUMMARY OF INVENTION

In general, electrical conductivity has a "trade-off" relationship with gas permeability in gas diffusion electrodes. Namely, when porosity is increased in order to improve gas permeability, electrical conductivity decreases. Similarly, when electrical conductivity is increased by having a precisely formed structure, gas permeability decreases. Thus, it is difficult to ensure high electrical conductivity and gas permeability concurrently. In Patent Literature 1, the extension of the layer not containing the electrically conductive material, as described above, provides preferable porosity in the material so as to ensure sufficient gas permeability. However, electrical resistance in the thickness direction increases because of the interposed PTFE resin layer that does not contain the electrically conductive material. In addition, the electrically conductive material only consists of carbon black, which also increases the electrical resistance in the plane direction.

An object of the present invention is to provide a gas diffusion layer for a fuel cell capable of concurrently ensuring high electrical conductivity and gas permeability, which are generally in a trade-off relationship, so as to contribute to an increase in performance of a polymer electrolyte fuel cell and also provide a method for manufacturing such a gas diffusion layer.

A gas diffusion layer for a fuel cell according to an aspect of the present invention includes a gas diffusion layer substrate and a microporous layer formed on the surface of the gas diffusion layer substrate. The microporous layer is formed into a sheet-like shape including a binder and a carbon material containing at least scale-like graphite, and the sheet-like microporous layer is attached to the gas diffusion layer substrate.

A method for manufacturing a gas diffusion layer for a fuel cell according to an aspect of the present invention includes: preparing ink for forming a microporous layer sheet including a binder and a carbon material; applying the ink to a holding sheet and baking it to form the microporous layer sheet on the holding sheet; removing the microporous layer sheet from the holding sheet; and attaching the microporous layer sheet removed from the holding sheet to a gas diffusion layer substrate.

BRIEF DESCRIPTION OF DRAWINGS

FIG. 2($a$) is a plan view, and FIG. 2($b$) is a side view.

FIG. 3($a$) is a plan view, and FIG. 3($b$) is a side view.

DESCRIPTION OF EMBODIMENTS

A gas diffusion layer (GDL) for a fuel cell according to an embodiment of the present invention, a microporous layer (MPL) sheet used therein, and a method for manufacturing these layers will be explained in detail below. Hereinafter, the MPL sheet may be simply referred to as a sheet. It should be noted that the symbol "%" in this description represents a percentage by mass unless otherwise specified. In addition, dimensional ratios in the drawings are magnified for convenience of explanation and may be different from actual ratios.

[GDL]

The GDL according to the present invention includes, as described above, the MPL sheet including a binder and a carbon material containing at least scale-like graphite, and a GDL substrate to which the MPL sheet sticks. The GDL is preferably used as a gas diffusion layer for a fuel cell. It should be noted that "sticking" does not mean that a material is merely applied to an adhesive surface but means that a material formed separately is attached to the adhesive surface.

In general, a GDL including an MPL has a stacking structure obtained in a manner wherein an MPL in a wet state is applied to a GDL substrate. However, such a method for forming the MPL decreases gas permeability because MPL ink enters the GDL substrate, which causes clogging of the GDL substrate. In addition, since the surface of the GDL substrate remains corrugated even after the formation of the MPL by ink application, the attacking behavior of GDL substrate fibers against an electrolyte membrane is not decreased sufficiently.

In contrast, in the GDL according to the present invention, the ink is not applied directly to the GDL substrate, but the preliminarily prepared MPL sheet is attached to the GDL substrate. This prevents the substrate from clogging caused by entrance of the ink. In addition, the attachment of the sheet reduces the surface roughness of the substrate. Accordingly, the attacking behavior of the GDL substrate fibers against the electrolyte membrane can be decreased.

Figure 1:
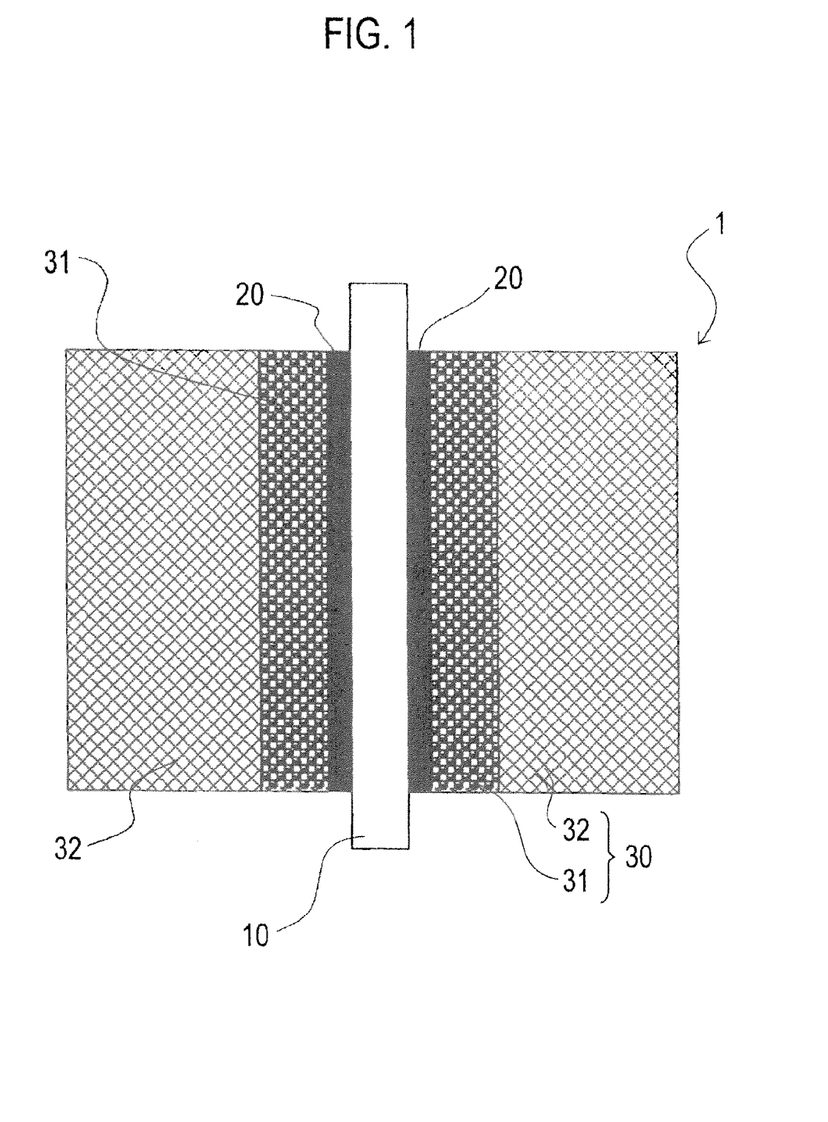
FIG. 1 is a schematic cross-sectional view showing a structural example of a membrane electrode assembly using a gas diffusion layer for a fuel cell according to an embodiment of the present invention.

FIG. 1 shows a structural example of a membrane electrode assembly (MEA) using the GDL according to the present invention. The MEA 1 shown in FIG. 1 includes an electrode membrane 10 interposed between an anode and a cathode and further includes a catalyst layer 20, an MPL 31, and a GDL substrate 32 in each electrode. In particular, the MPL 31 and the GDL substrate 32 form a GDL 30. Here, the MPL 31 includes an MPL sheet attached to the GDL substrate 32.

Examples of the electrolyte membrane 10 include a commonly used perfluorosulfonic acid electrolyte membrane and a hydrocarbon electrolyte membrane. Examples of the perfluorosulfonic acid electrolyte membrane include Nafion (registered trademark, made by DuPont Corporation), Aciplex (registered trademark, made by Asahi Kasei Corporation), and Flemion (registered trademark, made by Asahi Glass Co., Ltd.). Examples of the hydrocarbon electrolyte membrane include hydrocarbon resin including sulfonic acid groups, a material in which an inorganic acid such as phosphoric acid is doped into a hydrocarbon polymer compound, an organic/inorganic hybrid polymer of which part is substituted by functional groups of a proton conductor, and a proton conductor in which a polymer matrix is impregnated with a phosphoric acid solution or a sulfuric acid solution. Here, the hydrocarbon polymer electrolyte including sulfonic acid groups is preferable in view of resistance to oxidation, low gas permeability, ease of production, and low cost. Preferable examples of the hydrocarbon electrolyte include sulfonated polyaryl ether sulfone (S-PES), polybenzimidazole (PBI), polybenzoxazole (PBO), sulfonated polyphenoxybenzoyl phenylene (S-PPBP), and polyether ether ketone (S-PEEK).

The catalyst layer 20 is obtained in a manner as to mix the perfluorosulfonic acid electrolyte solution or the hydrocarbon electrolyte solution into carbon supporting platinum or a platinum alloy. Examples of the carbon include carbon black (such as oil furnace black, acetylene black, ketjen black, thermal black, and channel black), graphite, and activated carbon. Further, a water repellent agent and a pore forming agent may be added as necessary.

As described above, the MPL 31, including the MPL sheet, contains scale-like graphite as an essential carbon material and a binder. In view of further improving electrical conductivity and gas permeability, it is preferable to further add a carbon material serving as an electrically conductive path material or a spacer material. The electrically conductive path material is a material interposed between pieces of the scale-like graphite to improve electrical conductivity therebetween. The spacer material is a material interposed between pieces of the scale-like graphite to extend the distance therebetween and thereby improve permeability of reactant gas such as fuel gas and oxidant gas. The thickness of the MPL 31 is preferably in the range from 10 μm to 100 μm.

Figure 2:
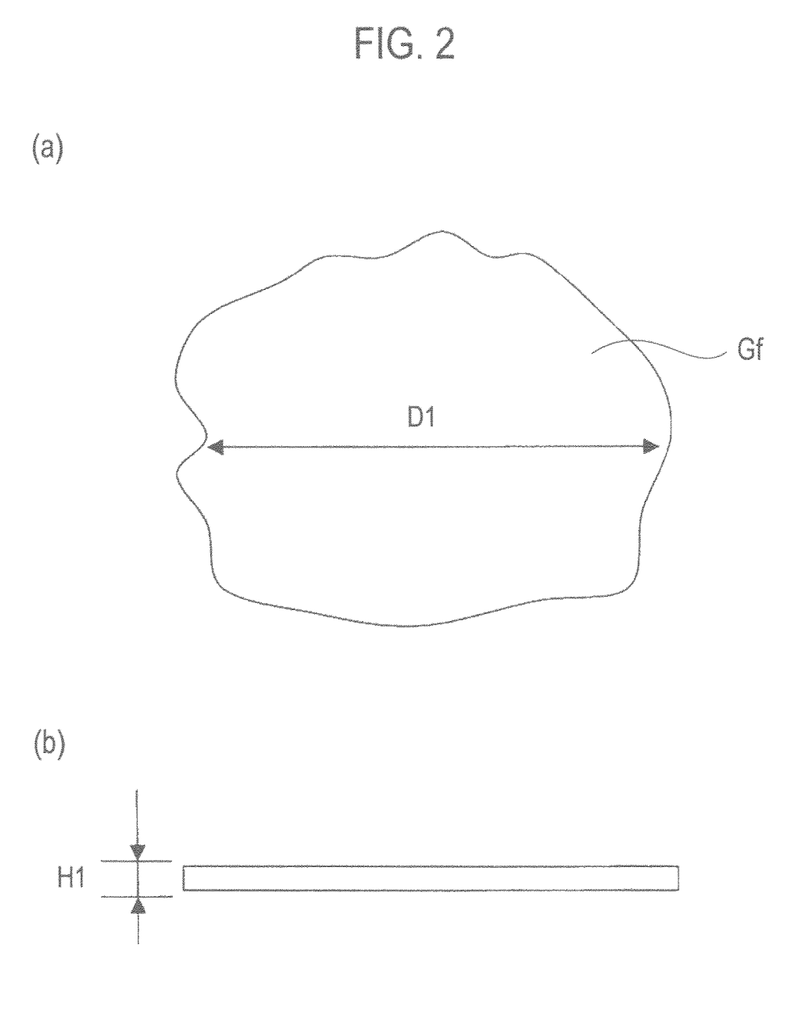
FIG. 2 shows a configuration of scale-like graphite included in a microporous layer in the gas diffusion layer for a fuel cell according to the embodiment of the present invention.

The scale-like graphite has high crystallinity and has a scale-like shape as shown in FIG. 2(a). Further, as shown in FIG. 2(a) and FIG. 2(b), the scale-like graphite has a high aspect ratio (average flat diameter D1/thickness H1). The scale-like graphite according to the present invention represents graphite having a thickness H1 approximately in the range from 0.05 μm to 1 μm and an aspect ratio approximately in the range from 10 to 1000. The scale-like graphite contributes to improvement in gas permeability in the thickness direction and orthogonally in the plane direction. The scale-like graphite also contributes to reduction in resistance in the plane direction, in other words, contributes to improvement in electrical conductivity. The average flat diameter D1 of the scale-like graphite is an average diameter in the flat plane direction observed by a laser diffraction/scattering method. The thickness H1 of the scale-like graphite may be observed with a scanning electron microscope (SEM) or a transmission electron microscope (TEM). Particularly, the average flat diameter D1 is preferably in the range from 5 μm to 50 μm because a diameter in this range can improve electrical conductivity and gas permeability with no influence on the thickness of the MPL. If the average flat diameter is smaller than 5 μm, the gas permeability is not improved. If the average flat diameter is larger than 50 μm, the effect derived from the mixture of the electrically conductive path material cannot be ensured sufficiently.

Examples of the electrically conductive path material used include carbon black (such as oil furnace black, acetylene black, ketjen black, thermal black, and channel black), small-diameter scale-like graphite, and carbon fibers. An average particle diameter of the electrically conductive path material is preferably 10 nm or larger and smaller than 5 μm.

Note that "the average particle diameter" represents a value calculated with a scanning electron microscope (SEM) or a transmission electron microscope (TEM) as an average value of particle diameters of the particles observed in several to several tens of fields of view. Here, "the particle diameter" represents the greatest length between any two points on the circumference of the active material particle (the observed plane) observed by observation means such as a scanning electron microscope (SEM) or a transmission electron microscope (TEM). Particle diameters and average particle diameters of other constituents may be determined in the same manner.

Among the materials used as the electrically conductive path material, acetylene black is preferable in view of improvement in productivity. In this case, the mixed content of the acetylene black in the MPL is preferably in the range from 5% to 25% in view of improving both gas permeability and electrical conductivity more reliably. If the content of the acetylene black is less than 5%, the resistance cannot be reduced sufficiently because of a decrease in contact area. If the content is greater than 25%, the gas permeability tends to decrease because pores are filled with small-diameter particles.

Alternatively, carbon black having a specific surface area of 1000 $m^2/g$ or greater is preferably used as the electrically conductive path material. This can further reduce the resistance. The mixed content of the carbon black in the MPL is preferably in the range from 1% to 5% in view of ensuring the effect of the carbon black more reliably.

As another example of the electrically conductive path material, the use of small-diameter scale-like graphite having an average flat diameter D1 of smaller than 5 μm, contributes to reducing thermal resistance, that is, improving thermal conductivity. As a result, the electrical conductivity in a low wet state is improved. In view of improving both gas permeability and electrical conductivity, the content ratio of the small-diameter scale-like graphite used in the MPL is preferably in the range from 30% to 70%. If the content of the scale-like graphite having the average flat diameter D1 of smaller than 5 μm is less than 30%, the resistance cannot be reduced sufficiently because of a decrease in contact area. If the content is greater than 70%, the amount of the binder is relatively decreased and as a result, the MPL cannot function sufficiently. Note that, if the grain diameter of the scale-like graphite can be reduced to substantially the same level as the carbon black, it is also preferable to reduce the content ratio of the scale-like graphite to substantially the same level as the carbon black. The average flat diameter D1 and the thickness H1 of the small-diameter scale-like graphite can be observed in a manner similar to the scale-like graphite described above.

Figure 3:
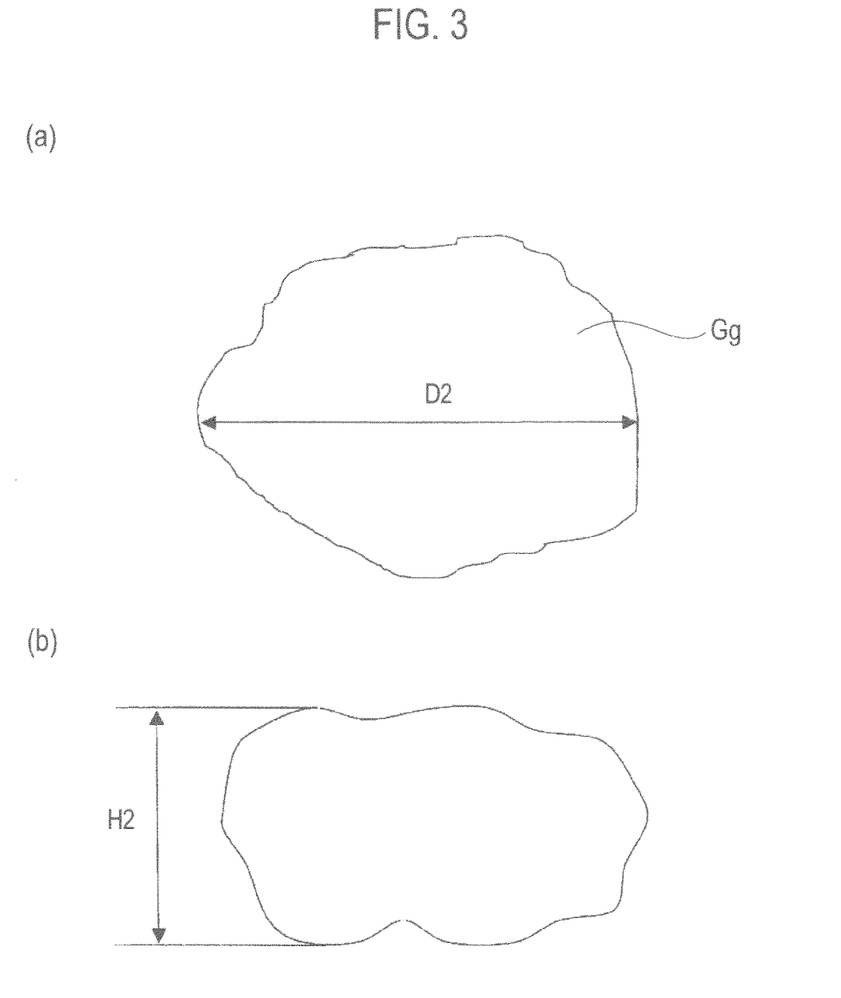
FIG. 3 shows a configuration of granular graphite serving as a spacer material in the microporous layer in the gas diffusion layer for a fuel cell according to the embodiment of the present invention.

As for the spacer material, granular graphite having an average grain diameter in the range from 1 μm to 10 μm may be used. Such granular graphite can ensure high electrical conductivity and gas permeability concurrently. The mixed ratio of the granular graphite used as the spacer material in the MPL is preferably in the range from 5% to 35% in view of ensuring the effect described above more reliably. The granular graphite has high crystallinity and has an aspect ratio (average flat diameter D2/thickness H2) approximately in the range from 1 to 3 as shown in FIG. 3(a) and FIG. 3(b). The average flat diameter D2 and the thickness H2 of the granular graphite can be observed in a manner similar to the scale-like graphite described above.

The binder used together with the carbon materials described above is preferably capable of ensuring strength of the MPL by binding each carbon material and concurrently functioning as a water repellent agent. For example, polytetrafluoroethylene (PTFE) may be mainly used as the binder. Alternatively, a tetrafluoroethylene-hexafluoropropylene copolymer (FEP) or a tetrafluoroethylene-perfluoro(alkyl vinyl ether) copolymer (PFA) may also be used.

The GDL substrate composing the GDL together with the MPL may be a substrate including carbon fibers such as carbon paper, carbon cloth, or non-woven fabric and impregnated with, for example, PTEF as a water repellent agent. Note that the substrate may not be subjected to water repellent treatment, or may be subjected to hydrophilic treatment, depending on the discharge property of the MEA using the GDL and the surface condition of the separator. In addition, the GDL substrate may be impregnated with graphite, carbon black, or a mixture thereof.

The MEA shown in FIG. 1 may be manufactured in a manner such that the GDL 30 provided with the MPL 31 and obtained by sticking the MPL sheet on the GDL substrate 32, is attached to the electrolyte membrane 10 to which the catalyst layer 20 has been transferred or directly applied by hot press. Alternatively, a method in which the catalyst layer 20 preliminarily applied to the GDL 30 on the MPL side is attached to the electrode membrane 10 by hot press, may be used. The conditions of application or attachment by hot press vary depending on whether the perfluorosulfonic acid electrolyte or the hydrocarbon electrolyte is used as an electrolyte in the electrolyte membrane and the catalyst layer.

Figure 4:
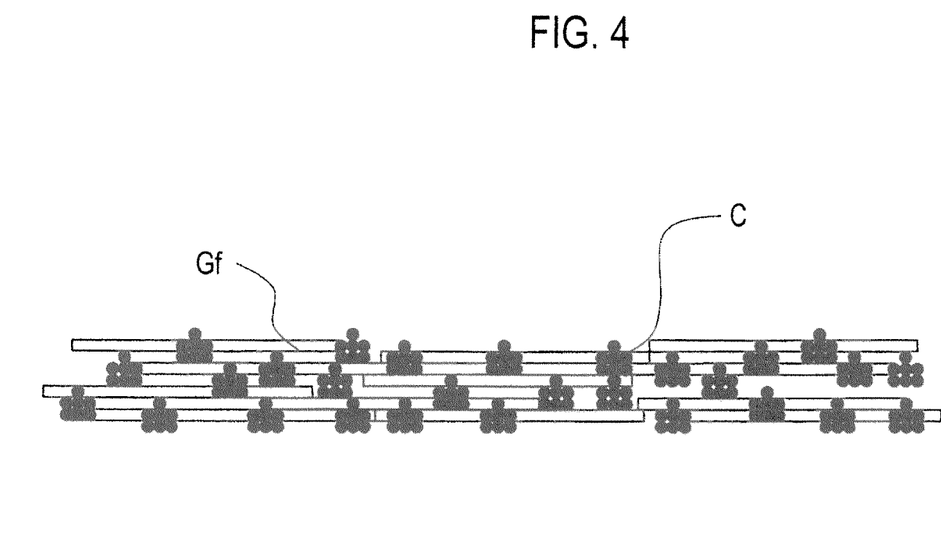
FIG. 4 is a schematic cross-sectional view showing an example of a case where a carbon material including large-diameter scale-like graphite and carbon black (an electrically conductive path material) is used in the microporous layer in the gas diffusion layer for a fuel cell according to the embodiment of the present invention.

FIG. 4 to FIG. 7 are enlarged schematic views each showing a typical structural example of the MPL in the GDL according to the present invention, obtained by combining the respective carbon materials described above. FIG. 4 shows a case in which the MPL is composed of the scale-like graphite, the carbon black as the electrically conductive path material, and the binder (not shown in the figure). In this case, plural thin pieces of the scale-like graphite Gf are arranged in parallel with each other in the plane direction of the layers. This configuration can ensure gas permeability in the thickness and plane directions and electrical conductivity in the plane direction in the MPL concurrently. In addition, carbon black C is held between the pieces of the scale-like graphite Gf as the electrically conductive path material so as to function to improve electrical conductivity in the thickness direction.

Figure 5:
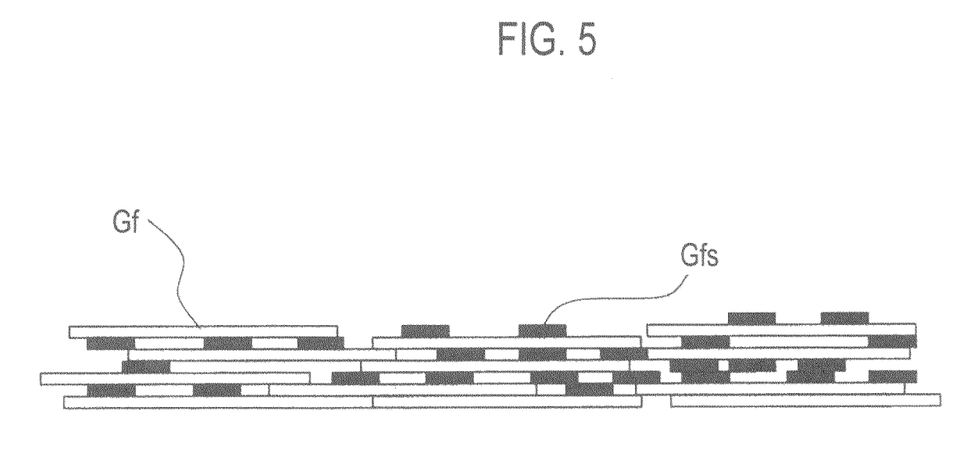
FIG. 5 is a schematic cross-sectional view showing an example of a case where a carbon material including scale-like graphite and small-diameter scale-like graphite (an electrically conductive path material) is used.

FIG. 5 shows a case of combining the large-diameter scale-like graphite and the small-diameter scale-like graphite used as the carbon material. The small-diameter scale-like graphite Gfs is held between the pieces of the large-diameter scale-like graphite Gf to function as the electrically conductive path material as in the case of the carbon black, so as to improve electrical conductivity in the thickness direction, as in the case of the carbon black.

Figure 6:
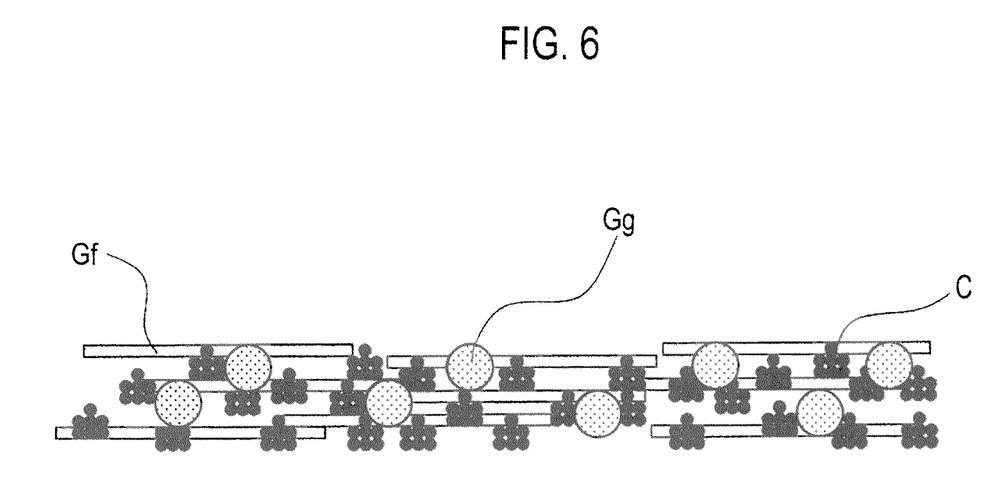
FIG. 6 is a schematic cross-sectional view showing a case where a carbon material including scale-like graphite, carbon black (an electrically conductive path material), and granular graphite (a spacer material) is used.

FIG. 6 shows a case of combining the scale-like graphite, the carbon black, and the granular graphite used as the carbon material. The scale-like graphite Gf and the carbon black C each function in a manner similar to the case of FIG. 4, and the granular graphite Gg further functions as the spacer material so as to improve gas permeability in the thickness direction and the plane direction.

Figure 7:
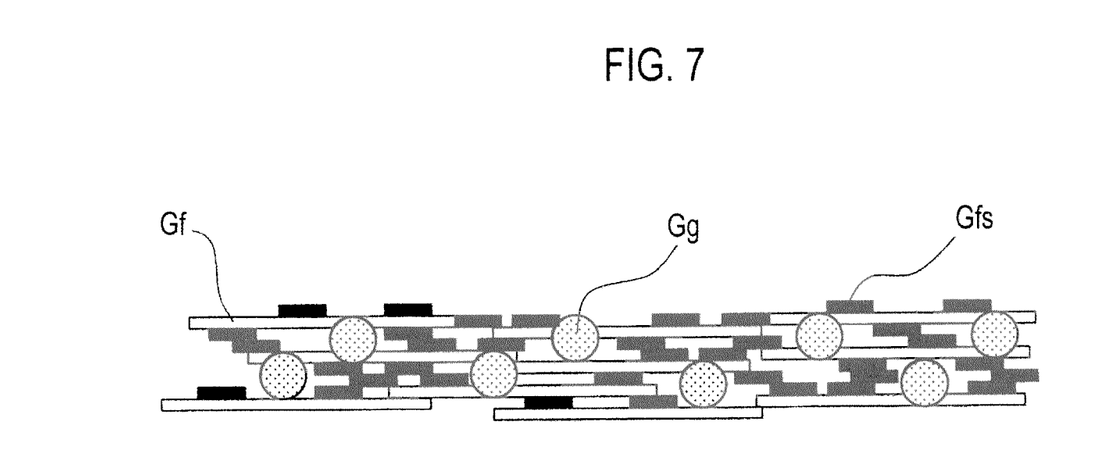
FIG. 7 is a schematic cross-sectional view showing an example of a case where a carbon material including scale-like graphite, small-diameter flake black (an electrically conductive path material), and granular graphite (a spacer material) is used.

FIG. 7 shows a case of combining the large-diameter scale-like graphite Gf, the small-diameter scale-like graphite Gfs, and the granular graphite Gg. Similar to the above-described cases, the large-diameter scale-like graphite Gf ensures gas permeability in the thickness direction and ensures gas permeability and electrical conductivity in the plane direction. The small-diameter scale-like graphite Gfs functions as the electrically conductive path material, and the granular graphite Gg functions as the spacer material.

It should be noted that the structural examples of the MPL according to the respective combinations of the carbon materials shown in FIG. 4 to FIG. 7 are merely representative examples. For example, the small-diameter scale-like graphite may be added to the structure shown in FIG. 4, the granular graphite may be further added thereto, or other combinations may be possible.

[Method for Manufacturing GDL]

Figure 8:
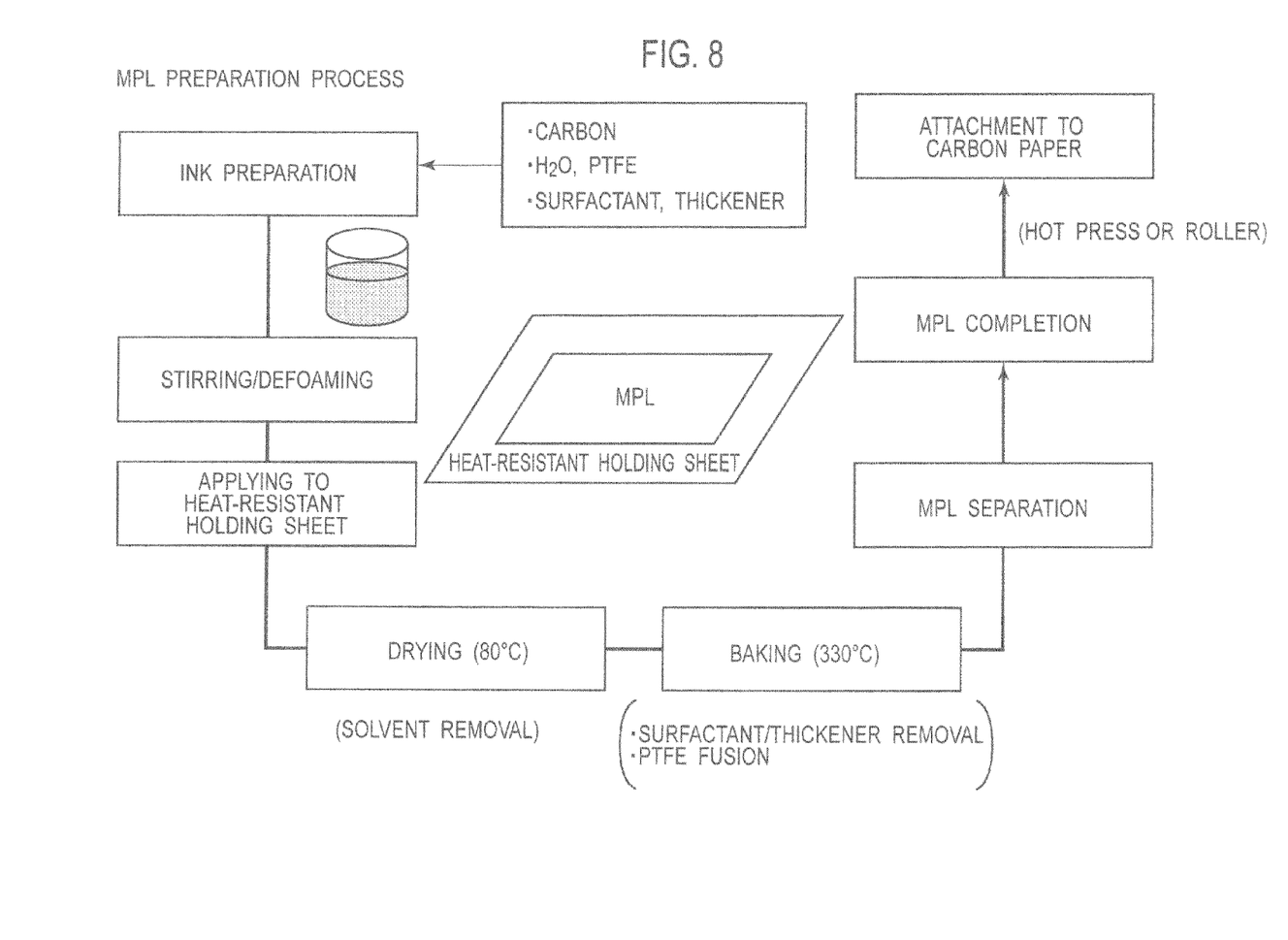
FIG. 8 is a diagram showing a process of manufacturing the gas diffusion layer for a fuel cell according to the embodiment of the present invention.

The GDL of the present embodiment can be manufactured according to the process shown in FIG. 8. In particular, first, MPL ink including scale-like graphite, a binder, carbon black and granular graphite as an electrically conductive path material and a spacer material as necessary, a surfactant, and a thickener, is prepared.

Next, the ink thus prepared is stirred and subjected to defoaming treatment and is then applied to a heat-resistant holding sheet, and is further dried at, for example, 80° C. and baked at 330° C., thereby obtaining a sheet-like MPL (an MPL sheet). The holding sheet used is not particularly limited as long as the sheet has heat resistance and chemical stability sufficient to be resistant to the baking treatment at the temperature described above. For example, a film including polyimide, polypropylene, polyethylene, polysulfone, or polytetrafluoroethylene and having a thickness approximately in the range from 10 μm to 100 μm may be used as the holding sheet. In particular, the film including polyimide can be preferably used.

Then, the MPL sheet removed from the holding sheet is attached to a GDL substrate made from, for example, a water-repellent carbon paper so as to obtain the GDL. The attaching process may be carried out by hot press. In the GDL obtained by such a method, the preliminarily prepared MPL sheet is attached to the GDL substrate, which is different from a GDL obtained in a manner such that ink is directly applied to a GDL substrate. Thus, the GDL of the present embodiment can prevent the substrate from clogging caused by the entrance of ink, thereby improving gas permeability of the GDL. In addition, the attachment of the sheet reduces the surface roughness of the substrate. Accordingly, the attacking behavior of the GDL substrate fibers against the electrolyte membrane is decreased, thereby improving electrical conductivity of the GDL.

EXAMPLES

Hereinafter, the present invention will be explained in more detail with reference to examples; however, the present invention is not limited to these examples.

Example 1

As for ink for preparing an MPL sheet, scale-like graphite having an average flat diameter of 15 μm, a thickness of 0.1 μm, and a specific surface area of 6 $m^2/g$, acetylene black (an electrically conductive path material) having a primary particle diameter of 40 nm and a specific surface area of 37 $m^2/g$, and PTFE as a binder, were used. The scale-like graphite, the acetylene black, and the PTFE were mixed in proportions of 61.25%, 8.75%, and 30% respectively so as to prepare MPL ink. Next, the MPL ink thus prepared was applied to a heat-resistant holding sheet made from a polyimide film having a thickness of 25 μm. The sheet was then dried at 80° C. and baked at 330° C. The baked material was removed from the holding sheet, so as to obtain an MPL sheet having a thickness of 60 μm.

Then, the MPL sheet was attached to a GDL substrate (made from a carbon paper with a thickness of 200 μm having been subjected to 10% water-repellent treatment with PTFE), by hot press at 80° C., at 2 MPa and for 3 minutes, thereby obtaining a GDL. In addition, a catalyst layer including platinum-supporting carbon and a perfluorosulfonic acid electrolyte solution, was formed on a perfluorosulfonic acid electrolyte membrane having a thickness of 25 μm. The catalyst layer was then held by the GDL described above so as to obtain an MEA. The platinum-supporting amount of the platinum-supporting carbon was set to 0.05 mg/$cm^2$ on the anode side and set to 0.35 mg/$cm^2$ on the cathode side.

Example 2

Similar operations to those of the above example were repeated except that the scale-like graphite, the acetylene black, and the PTFE were mixed in proportions of 56.875%, 13.125%, and 30% respectively, thereby obtaining an MEA of Example 2.

Example 3

Similar operations to those of the above example were repeated except that the scale-like graphite, the acetylene black, and the PTFE were mixed in proportions of 52.5%, 17.5%, and 30% respectively, thereby obtaining an MEA of Example 3.

Example 4

Similar operations to those of the above example were repeated except that the scale-like graphite, the acetylene black, and the PTFE were mixed in proportions of 43.75%, 26.25%, and 30% respectively, thereby obtaining an MEA of Example 4.

Example 5

Similar operations to those of the above example were repeated except that the scale-like graphite, the acetylene black, and the PTFE were mixed in proportions of 35%, 35%, and 30% respectively, thereby obtaining an MEA of Example 5.

Example 6

In addition to the carbon materials, granular graphite (a spacer material) having an average grain diameter of 2 μm and a specific surface area of 100 $m^2/g$ was used. The scale-like graphite, the acetylene black, the granular graphite, and the PTFE were mixed in proportions of 52.5%, 8.75%, 8.75%, and 30% respectively, thereby preparing MPL ink. Similar operations to those of the above example (other than the ink preparation) were repeated so as to obtain an MEA of Example 6.

Example 7

Similar operations to those of the above example were repeated except that the scale-like graphite, the acetylene black, the granular graphite, and the PTFE were mixed in proportions of 30.625%, 8.75%, 30.625%, and 30% respectively, thereby obtaining an MEA of Example 7.

Example 8

In stead of the acetylene black, ketjen black also serving as the electrically conductive path material and having a specific surface area of 1000 m$^2$/g or greater was used. Similar operations to those of the above example were repeated except that the scale-like graphite, the ketjen black, and the PTFE were mixed in proportions of 69.125%, 0.875%, and 30% respectively, thereby obtaining an MEA of Example 8.

Example 9

Similar operations to those of the above example were repeated except that the scale-like graphite, the ketjen black, and the PTFE were mixed in proportions of 67.375%, 2.625%, and 30% respectively, thereby obtaining an MEA of Example 9.

Example 10

Similar operations to those of the above example were repeated except that the scale-like graphite, the ketjen black, and the PTFE were mixed in proportions of 65.625%, 4.375%, and 30% respectively, thereby obtaining an MEA of Example 10.

Example 11

Similar operations to those of the above example were repeated except that ink including 70% of the scale-like graphite and 30% of the PTFE was used without mixing any electrically conductive path material or spacer material, thereby obtaining an MEA of Example 11.

Comparative Example 1

A commercially available GDL (25BCH, manufactured by SGL Carbon Co.), to which MPL ink consisting of carbon black was applied, was used. Similar operations to those of the above example, except for the use of such a GDL, were repeated so as to obtain an MEA of Comparative Example 1.

Table 1 shows specifications of the GDL prepared in each of Examples and Comparative Example as described above.

(Measurement of Gas Permeability of MPL Sheet in Thickness Direction)

With regard to the MPL sheet before being attached to the GDL substrate, the time (Gurley value) required for permeation of 100 mL of gas was measured by the Gurley method. According to the result thus obtained, permeation (m$^2$), with the thickness equalized, was calculated.

(Measurement of Electrical Resistance of MPL Sheet in Thickness Direction)

Further, with regard to the MPL sheet before being attached to the GDL substrate, the electrical resistance in the thickness direction was measured. The electrical resistance was measured in a manner such that both surfaces of the MPL having an area of 0.95 cm$^2$ were held by gold leaf, and electricity was supplied thereto while applying a load. At the first cycle, the current was set to 1 A, and the load was set to 5 MPa. At the second cycle, the load was set to 1 MPa, and the value at the second cycle in each example was compared.

Figure 9:
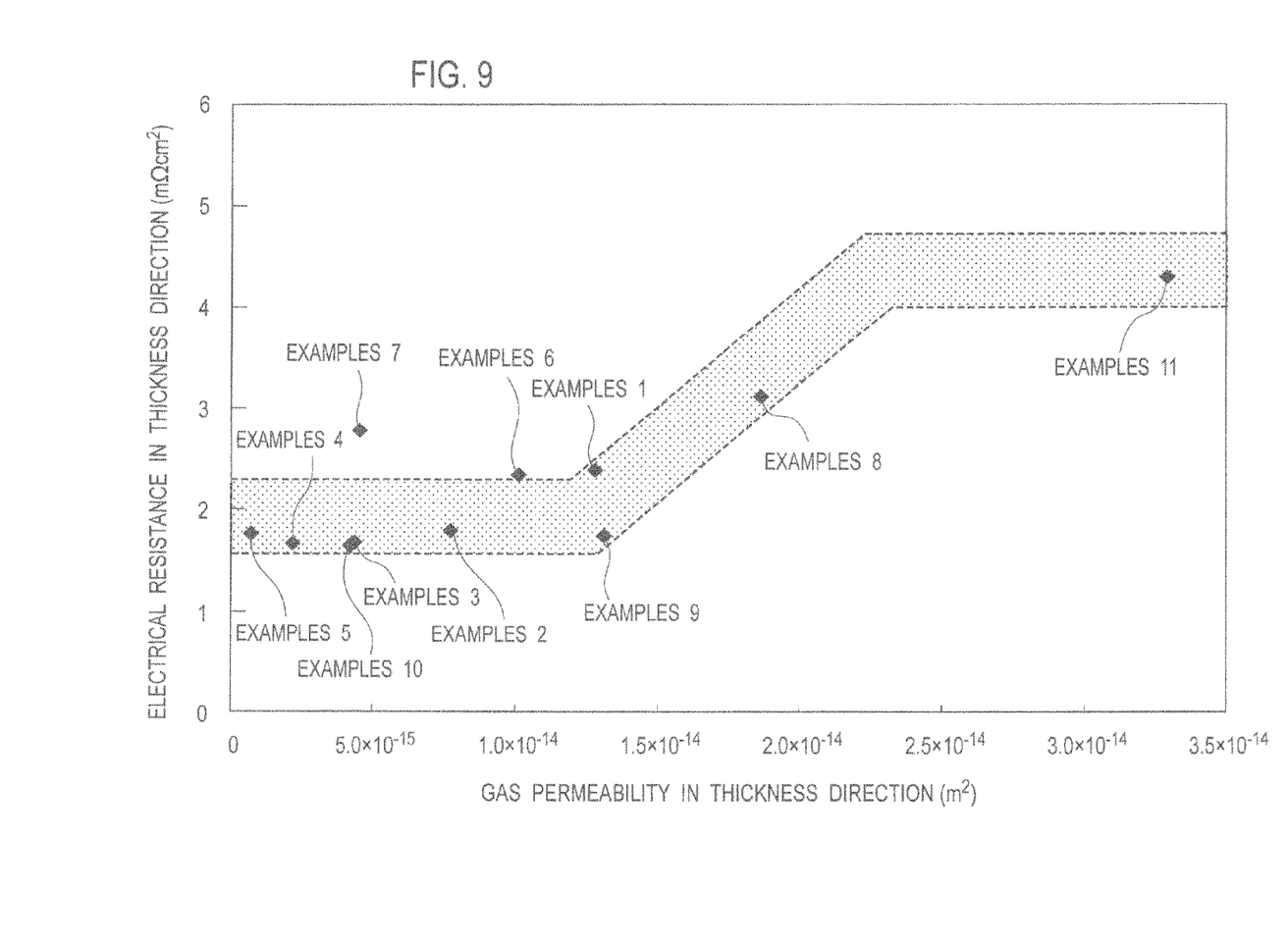
FIG. 9 is a graph showing a relationship between gas permeability and electrical resistance in the thickness direction of the microporous layer sheet obtained in each example.

FIG. 9 shows a relationship between the gas permeability in the thickness direction and the electrical resistance in the thickness direction of the MPL sheet obtained in each of Examples 1 to 11. It is apparent from FIG. 9 that for Example 11, where no electrically conductive path material or spacer material was included but the carbon material containing the scale-like graphite was included, although the gas permeability is high, electrical conductivity is low and electrical resistance is high, compared with the cases of including the electrically conductive path material.

For the cases in which the acetylene black was mixed as the electrically conductive path material, although the gas permeability was lower, electrical conductivity was higher and electrical resistance was lower. As is clear from Examples 2 to 5, a decrease in gas permeability is observed, and an improvement in electrical conductivity, that is a reduction in resistance, cannot be achieved even though the content of the electrically conductive path material was higher. In addition, as is clear from Examples 8 to 10, each using the carbon black having a specific surface area of 1000 m$^2$/g or greater, although the content of the carbon black is less than the content of acetylene black used in examples 2 to 5, electrical conductivity at a level equal to or greater than that in the cases of using the acetylene black, can be ensured. Further, the mixture of the spacer material, in addition to the scale-like graphite and the electrically conductive path material, can

TABLE 1

| Classification | Content of Scale-like Graphite (%) | Electrically Conductive Path Material Type | Content (%) | Space Material Type | Content (%) | Spacer Material Type | Content (%) |
|---|---|---|---|---|---|---|---|
| Example 1 | 61.25 | Acetylene Black | 8.75 | — | — | PTFE | 30 |
| Example 2 | 56.875 | Acetylene Black | 13.125 | — | — | PTFE | 30 |
| Example 3 | 52.5 | Acetylene Black | 17.5 | — | — | PTFE | 30 |
| Example 4 | 43.75 | Acetylene Black | 26.25 | — | — | PTFE | 30 |
| Example 5 | 35 | Acetylene Black | 35 | — | — | PTFE | 30 |
| Example 6 | 52.5 | Acetylene Black | 8.75 | Grain Graphite | 8.75 | PTFE | 30 |
| Example 7 | 30.625 | Acetylene Black | 8.75 | Grain Graphite | 30.625 | PTFE | 30 |
| Example 8 | 69.125 | Ketjen Black | 0.875 | — | — | PTFE | 30 |
| Example 9 | 67.375 | Ketjen Black | 2.625 | — | — | PTFE | 30 |
| Example 10 | 65.625 | Ketjen Black | 4.375 | — | — | PTFE | 30 |
| Example 11 | 70 | — | — | — | — | PTFE | 30 |
| Comparative Example 1 | — | — | — | — | — | — | — | improve the gas permeability; however, the electrical conductivity in such a case is slightly inferior to that in Examples 1 to 5.

(Cell Power Generation Evaluation Result 1)

Figure 10:
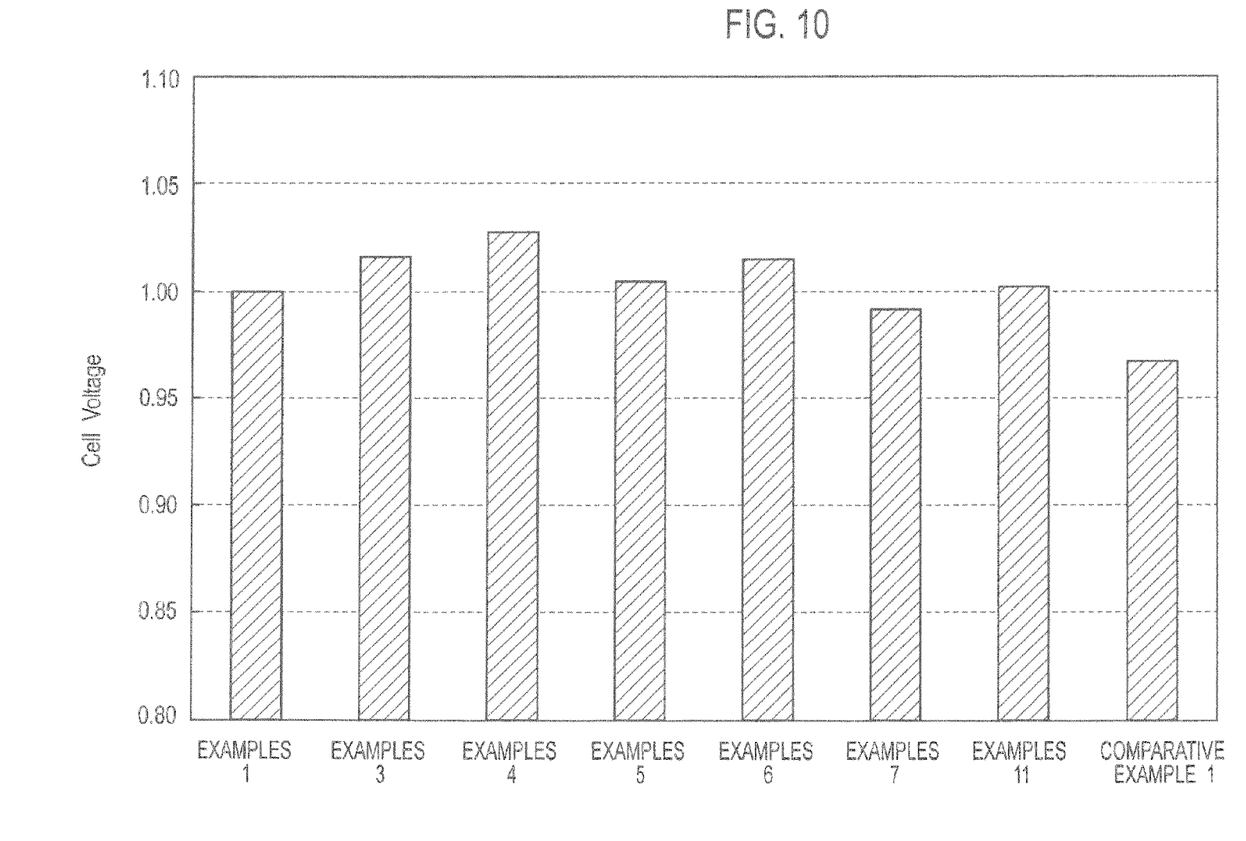
FIG. 10 is a graph showing a power generation performance of a cell obtained in each of Examples and Comparative Example under dry conditions.

Power generation was evaluated using a small single cell including the MEA obtained in each of Examples 1, 3 to 7, 11, and Comparative Example 1 under the conditions of $H^2$/air, 80° C., and 200 kPa_a. The active area was set to 5×2 cm. FIG. 10 shows the result of the power generation evaluation at 1 A/cm$^2$, in the case in which relative humidity was set to 40% RH in each of the anode and the cathode, as an example of a dry condition. The vertical axis of this graph indicates normalized relative values with respect to Example 1 whereby the value of Example 1 has been readjusted to "1". Under this dry condition, all examples could achieve higher performance than Comparative Example 1.

(Cell Power Generation Evaluation Result 2)

Figure 11:
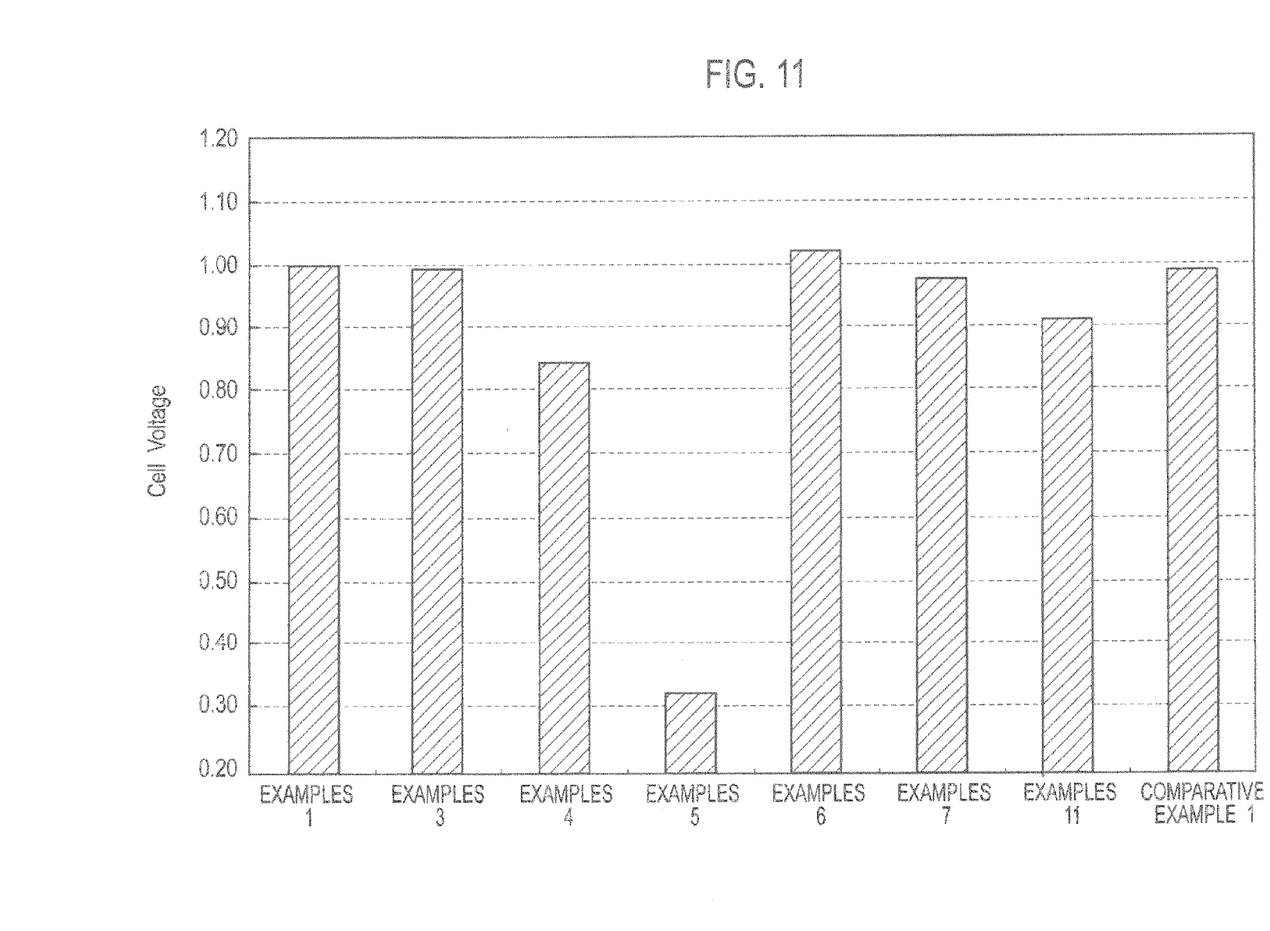
FIG. 11 is a graph showing a power generation performance of a cell obtained in each of Examples and Comparative Example under wet conditions.

Power generation was evaluated using a small single cell composed of the MEA obtained in each of Examples 1, 3 to 7, and 11, and Comparative Example 1 under the same conditions described above. The active area was set to 5×2 cm. FIG. 11 shows the result of the power generation evaluation at 1 A/cm$^2$, in the case in which relative humidity was set to 90% Rh in each of the anode and the cathode, as an example of a wet condition. The vertical axis of this graph also indicates normalized relative values whereby the value of Example 1 has been readjusted to Under this wet condition, Examples 1, 3, 6, and 7 exhibited substantially the same performance as Comparative Example 1. The other examples showed lower performance than Comparative Example 1. The tests revealed that Examples 1, 3, 6, and 7 particularly could achieve improved performance under the dry condition, while keeping performance under the wet condition, in contrast with the conventional GDL.

The entire content of Japanese Patent Application No. P2011-135067 (filed on Jun. 17, 2011) is herein incorporated by reference.

Although the present invention has been described above by reference to the examples, the present invention is not limited to the descriptions thereof, and it will be apparent to those skilled in the art that various modifications and improvements can be made.

INDUSTRIAL APPLICABILITY

According to the present invention, the GDL was obtained in a manner such that the preliminarily prepared microporous layer sheet was attached to the gas diffusion layer substrate. Such a configuration can prevent the components composing the microporous layer from entering the gas diffusion layer substrate, thereby ensuring gas permeability. In addition, the microporous layer containing scale-like graphite as an electrically conductive material can improve electrical conductivity and gas permeability.

REFERENCE SIGNS LIST

1 Membrane electrode assembly
10 Electrolyte membrane
20 Catalyst layer
30 Gas diffusion layer for fuel cell (GDL)
31 Microporous layer (MPL)
32 Gas diffusion layer substrate (GDL substrate)
Gf Scale-like graphite
Gfs Small-diameter scale-like graphite (electrically conductive path material)
Gg Granular graphite (spacer material)
C Carbon black (electrically conductive path material)

The invention claimed is:

1. A gas diffusion layer for a fuel cell, comprising:
a gas diffusion layer substrate including carbon fiber; and
a microporous layer formed on a surface of the gas diffusion layer substrate, the microporous layer being formed into a sheet shape including:
a binder; and
a carbon material containing scale graphite and a spacer material,
wherein the spacer material is granular graphite having an average grain diameter in a range from 1 μm to 10 μm,
wherein a mass proportion of the granular graphite is in a range from 5% to 35% of the entire microporous layer, and
wherein the microporous layer is attached to the gas diffusion layer substrate.

2. The gas diffusion layer for a fuel cell according to claim 1, wherein an average flat diameter of the scale graphite is in a range from 5 μm to 50 μm.

3. The gas diffusion layer for a fuel cell according to claim 2, wherein the carbon material further contains an electrically conductive path material, and the electrically conductive path material is scale graphite having an average flat diameter of smaller than 5 μm.

4. The gas diffusion layer for a fuel cell according to claim 3, wherein a mass proportion of the scale like scale graphite is in a range from 30% to 70% of the entire microporous layer.

5. The gas diffusion layer for a fuel cell according to claim 1, wherein the carbon material further contains an electrically conductive path material, and the electrically conductive path material is acetylene black.

6. The gas diffusion layer for a fuel cell according to claim 5, wherein a mass proportion of the acetylene black is in a range from 5% to 25% of the entire microporous layer.

7. The gas diffusion layer for a fuel cell according to claim 1, wherein the carbon material further contains an electrically conductive path material, and the electrically conductive path material is carbon black having a specific surface area of 1000 m$^2$/g or greater.

8. The gas diffusion layer for a fuel cell according to claim 7, wherein a mass proportion of the carbon black is in a range from 1% to 5% of the entire microporous layer.

9. A membrane electrode assembly for a fuel cell, comprising:
an electrolyte membrane;
a catalyst layer stacked on the electrolyte membrane; and
the gas diffusion layer for a fuel cell according to claim 1 stacked on the catalyst layer.

10. The gas diffusion layer for a fuel cell according to claim 1, wherein the binder binds the carbon material of the microporous layer together.

11. A method for manufacturing a gas diffusion layer for a fuel cell, comprising:
preparing ink for forming a microporous layer sheet including a binder and a carbon material;
applying the ink to a holding sheet and baking it to form the microporous layer sheet on the holding sheet;
removing the microporous layer sheet from the holding sheet; and
attaching the microporous layer sheet removed from the holding sheet to a gas diffusion layer substrate.

* * * * *